United States Patent [19]

Thomas

[11] Patent Number: 4,482,207
[45] Date of Patent: Nov. 13, 1984

[54] OPTICAL GRATING AND METHOD OF MANUFACTURE

[75] Inventor: Lowell E. Thomas, Tewksbury, Mass.

[73] Assignee: Dynamics Research Corporation, Wilmington, Mass.

[21] Appl. No.: 278,672

[22] Filed: Jun. 29, 1981

[51] Int. Cl.[3] .............................................. G02B 5/18
[52] U.S. Cl. ........................ 350/162.20; 350/96.19; 350/162.17
[58] Field of Search .............. 350/96.19, 96.3, 162.17, 350/162.20, 162.23, 162.24

[56] References Cited

U.S. PATENT DOCUMENTS

| | | | |
|---|---|---|---|
| 3,484,153 | 12/1969 | Hunt et al. | 350/162.24 |
| 3,674,336 | 7/1972 | Kogelnik | 350/96.19 |
| 3,891,302 | 6/1975 | Dabby et al. | 350/96.3 |
| 3,968,789 | 10/1972 | Wolber | 350/162.22 |
| 4,194,162 | 3/1980 | Uematsu | 350/96.19 |
| 4,281,894 | 8/1981 | Guha | 350/162.23 |

*Primary Examiner*—John D. Lee
*Assistant Examiner*—Robert E. Wise
*Attorney, Agent, or Firm*—Weingarten, Schurgin, Gagnebin & Hayes

[57] ABSTRACT

An optical grating is provided by the deposition of thin layers of alternating materials on a substrate, the cross-section of which provides a three-dimensional grating. In one embodiment an alternating layered structure is provided by vacuum deposition of optically differing materials on a planar substrate, thereby to provide alternating layers defining planes parallel one to the other. The resulting structure is sectioned and polished such that the exposed adjacent ends of the alternating layers provide either a reflective or transmission grating of exceptional precision and accuracy due to the linear sharply-defined interfaces between adjacent exposed layers. In one embodiment, the finished structure is utilized as an optical coupler for coupling light into and out of an optical integrated circuit. In another embodiment, the grating is incorporated into a substrate over which an optical waveguide or an electro-optical element may be formed.

4 Claims, 8 Drawing Figures

OPTICAL GRATING AND METHOD OF MANUFACTURE

FIELD OF INVENTION

This invention relates to optical gratings and more particularly to optical gratings produced from layers of alternating materials.

BACKGROUND OF THE INVENTION

Methods for making optical gratings have developed from two primary starting points. First, mechanical ruling or dividing is utilized where a machine indexes the cutting of finely separated lines on a substrate. Second, interference patterns are generated optically and are reproduced in a photographic substance such that the patterning, for instance of a photoresist is accomplished by imaging an interference pattern onto the photoresist. Development of the photoresist leaves a highly defined pattern, which is then utilized as a mask for vapor deposition, the pattern of which forms a transmission grating. It will be appreciated that the latter technique has been successfully developed with the aid of monochromatic light sources such as lasers. However, the grating lines are in general curved, corresponding to the concentric circles of the interference pattern. With respect to mechanical ruling or dividing, this is a time consuming process requiring extreme control and has, for the most part, been replaced by the optical generation technique described above.

There are many varieties of gratings, but they can be divided into two basic types: reflection and transmission. There are also many variations in groove or line profile to enhance the quality of the grating, which techniques include echelon, blazed, and laminar approaches. It will be appreciated that all of these gratings fall into a category relating to the modification of a surface. Either the surface of a substrate is itself modified or the grating is produced by the modification of a coating on the surface of a substrate.

Gratings of the transmissive type have been used as optical couplers for the coupling of light into and out of optical waveguides which form so-called optical integrated circuits. One such technique is described in the Journal of Applied Physics Letters, June 15, 1970, Vol. 16, No. 12 entitled "Grating Coupler for Efficient Excitation of Optical Guided Waves in Thin Film", pps. 523-525. In this article a method of coupling a laser beam into a thin film optical waveguide utilizes an optical grating that is made utilizing photoresist and is fabricated directly on the top surface of the optical waveguide. The grating is provided, in one embodiment, by the aforementioned photolithographic technique in which an interference pattern is imaged on a photoresist which lies directly on the glass film serving as the optical waveguide. As noted in this article, the potential for producing miniaturized optical integrated circuits on a single wafer which is resistant to vibrations and thermal effects has raised the need for a simple, efficient means of coupling light into and out of thin film waveguides. Previous coupling techniques for such an application include edge illumination and evanescent field coupling with a prism.

While photolithographic techniques utilizing interference patterns have produced acceptable gratings in the past, it will be appreciated that the interference rings produced through interfering one laser beam with another are generally curved in nature. Moreover, it is oftentimes inconvenient to pattern a grating directly on the optical integrated circuit described above.

SUMMARY OF THE INVENTION

In the subject invention a grating is provided through the deposition of thin layers of alternating materials, the cross-section of which provides a three-dimensional grating. In one embodiment, alternating opaque and transparent materials are vacuum deposited onto a substrate utilizing thin film deposition technology. In this manner, films of metals and dielectrics can be deposited with very precise thicknesses, in fact precise to units of a few angstroms. In one embodiment, SiO or glass layers are interleaved with CrSiO or chrome silica layers to provide, after cross-sectioning, an optical grating of extremely precise characteristics. Coating thicknesses utilized in the subject invention range from 10 angstroms to 10 microns, with a control of 1 to 2 angstroms in the thickness of a relatively thin layer (10 Å) and a control of 100 Å in the thickness of a relatively thick layer (10 microns). The grating period, in one embodiment involving radiation from a helium neon laser, is on the order of 0.665 microns, with the number of layers being built up to as many as desired. It will be appreciated that the selection of materials for the layers to achieve dimensional stability includes considerations of thermally-induced stress, thermal coefficients of expansion and the ability of one layer to slip relative to an adjacent layer.

It will be appreciated in thin film technology that there are various types of monitors utilized to measure the build up of films, the more common being the quartz crystal type. The degree of control in film thickness described above is necessary for the present invention since the film thickness determines the grating frequency accuracy. Typically, diffraction grating ruling accuracies are on the order of 100 Å. For thin layers the accuracy is approximately 1-10 Å and for thick layers the accuracy is approximately 100 Å. Thus, the subject technique can provide an order of magnitude improvement for thin layers, while matching the ruling accuracy for thick layers. While the subject gratings do not approach the size of gratings fabricated with classical approaches, the relatively new field of integrated optics has generated a need for miniature gratings and light coupling to and from electro-optic circuits which utilize semiconductor lasers. It is therefore a feature of the subject invention to provide a grating on a miniature scale which may be utilized in conjunction with a predetermined optical or electro-optical device where a precise periodic structure is required.

Equipment presently exists for the deposition of alternating layers of material under automatic control. Specific materials used for the layers depend on the wavelength of the energy source utilized and other parameters. It will be appreciated that the frequency of the grating is determined by the thicknesses of the alternating layers with the frequency being determined by device requirements where, for instance, it might be required to isolate some specific frequency as needed for optical and/or analog-to-digital conversion.

Cross-sectioning of the layers built up on a substrate, in one embodiment, is accomplished by mechanical cutting and polishing. In another embodiment this is accomplished by a dry etching process which involves ion beam milling, plasma etching, or sputter etching. In a still further embodiment, cross-section equivalents can be produced by deposition through a stencil.

In any of the above embodiments, the cross-section face or faces of the grating may be modified by chemical or dry etching techniques to provide facets as in blazed gratings. The grating faces can also be coated with materials to couple energy into the grating or for enhancement such as filtering, attenuation and reflection.

Moreover, the gratings can be sectioned on a bias so as to provide for fine tuning of the grating frequency and for accomodating the different angles of incidence of radiation.

In one embodiment, the alternating layers are deposited on a substrate and are then sandwiched in between the substrate and another mechanically stable and thick layer prior to cross-sectioning. This wafer may be adhesively or otherwise attached to the top surface of an optical waveguide and used as a transmission grating. In this manner miniature waveguide couplers may be fabricated which, when positioned appropriately on the top surface of an optical waveguide, serve to couple light into and out of the waveguide. It will be appreciated with the above technique that the optical coupler may be positioned at will and may be manufactured separately from the optical integrated circuit. Moreover, the linearity of the pattern being a function of the linear interfaces of the cross-sectioned layers is such that the lines of the grating are not curved, but rather have a straightness commensurate with the flatness of the substrate over which the alternating layers are deposited. Resolution at the interfaces between layers is determined by the vacuum deposition technique and not by a photolithography process. This improves the precision of the grating relative to that obtained photolithographically.

In another embodiment, the top surface of the grating and surrounding substrate material are provided with an overlying optical waveguide which crosses over the exposed face of the grating. Light is coupled into and out of the grating from the underneath side of the grating. This construction permits the patterning of optical waveguides on a substrate which has previously been provided with optical gratings which extend through the substrate. In general, for this embodiment the effective thickness of the substrate and grating is kept to a minimum, so as to maximize the amount of light through the grating.

In a still further embodiment, alternating layers are stenciled onto a substrate. Glass frit or other types of adhesive are patterned so as to surround the stenciled layers to a height matching the height of the layered structure. A block of substrate material is adhesively secured over the resulting structure and the combined structure is then sectioned to provide an extensive relatively thin substrate containing a grating which is in turn suitable for the formation of an optical waveguide thereon. Alternatively, no filler material need be used if the superimposed block is first provided with a channel corresponding in inner dimension to the outside dimension of the stenciled layers. Not only may an optical waveguide be provided on this specially prepared substrate, but also active electro-optical semiconductor devices may be built up on the substrate over the grating.

Thus, the specially prepared substrate can serve both as a substrate for standard semiconductor devices, patterned conductors and components, and also as a structure for light input and output to selected devices carried on the substrate.

BRIEF DESCRIPTION OF THE DRAWINGS

These and other features of the subject invention will be better understood in connection with the following detailed description taken in conjunction with the drawings of which.

DETAILED DESCRIPTION

Figure 1:
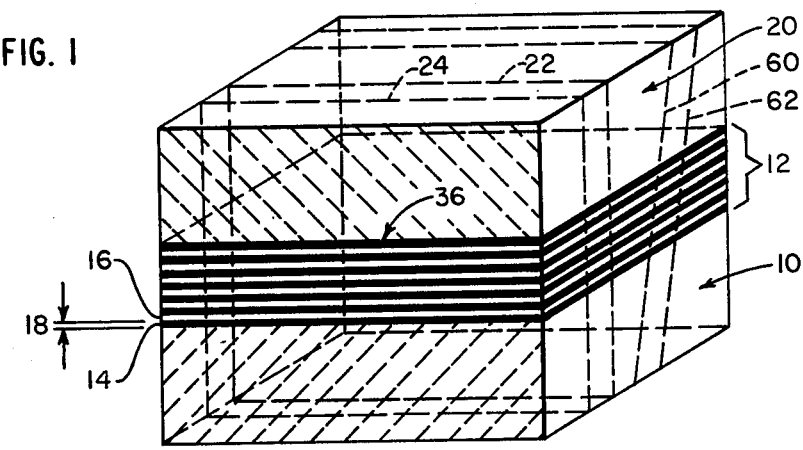
FIG. 1 is a sectional and perspective view of a structure which, when sectioned, results in the subject optical grating.

Referring now to FIG. 1, a substrate 10, which may be made of glass, silicon, ceramic, or indeed of any suitable material, is provided with a planar upper surface (not shown) onto which are sequentially deposited alternating layers 12, in which a first layer 14 is provided immediately underneath a second layer 16 which has some different optical property. In one embodiment, the different optical properties include light transmittance and light opacity. In an alternative embodiment, the differences in the alternating layers may be that of light reflectance and light transmission. The layers are sequentially built up in a conventional thin film deposition technique, which may include vacuum deposition. Materials having opposite or different optical properties suitable for thin film deposition include Metals: aluminum, gold, copper and silver; Dielectrics: cesium, silicon, tin oxides, magnesium, lithium, calcium flourides and lead and zinc sulfides; Semiconductors: germanium, selenium and tellurium. Layer thickness, as illustrated by arrows 18, is precisely controlled to within 1 to 100 angstroms as is also conventional. As mentioned hereinbefore, the total thickness of a layer may vary between 10 angstroms and 10 microns, depending on the frequency of the grating to be fabricated. As many as one hundred layers of material may be deposited on substrate 10 to build up the required lateral extent for the grating.

In order to aid in the sectioning of the alternating layers so as to provide the required grating, a mechanically stable thick layer, sheet, or plate 20 is provided such that the alternating layers 12 are sandwiched between two physically rigid structures. In one embodiment, the overlying plate is made of glass, as is the aforementioned substrate.

Figure 2:
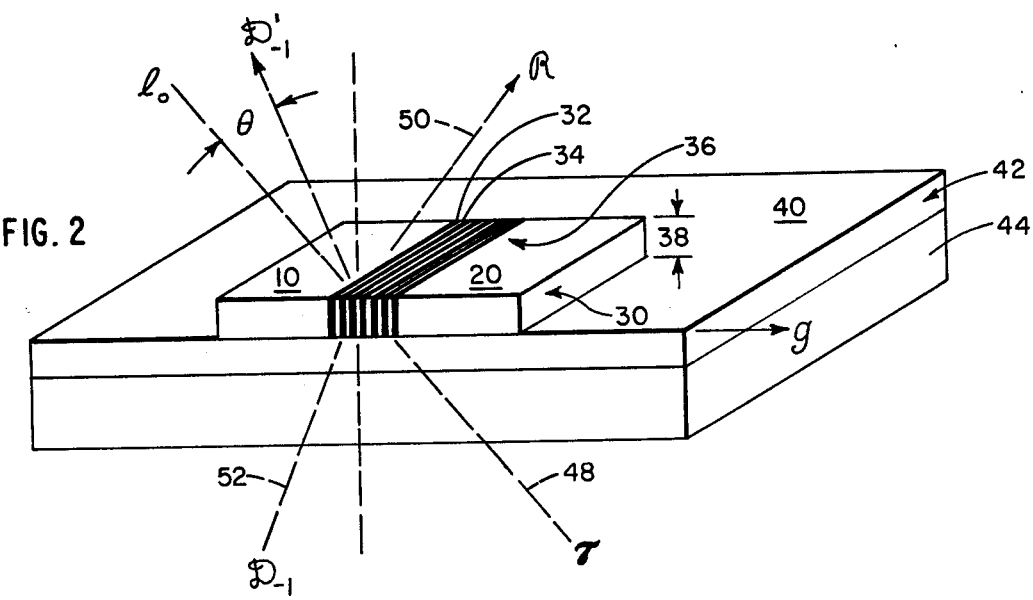
FIG. 2 is a diagramatic illustration of the subject grating in place over an optical waveguide.

In order to form the grating, the structure shown in FIG. 1 is sectioned along dotted lines 22 and 24, thereby to provide a grating 30 as illustrated in FIG. 2 having a lateral extent, with alternating lines 32 and 34 running transversely in a horizontal direction as illustrated. It will be appreciated that the sandwiching structures 10 and 20 have sandwiched in between thin three-dimensionsl bars of alternating materials which form either a reflective grating or a transmission grating depending on the application. The frequency of the grating is determined by the periodicity of the pattern or the number of lines per inch.

It will be appreciated that gratings formed in this manner have bars with extremely straight edges, such that the interface 36 between adjacent layers is uniform and linear. Moreover, with a planar surface for substrate 10, it will be appreciated that the layers lie in parallel planes, one on top of the other, such that the cross-section of the layers produces parallel lines of the same material interspersed with parallel lines of the alternating material.

It will be appreciated that the thickness 38 of the grating is determined by the distance between dotted lines 22 and 24 of FIG. 1. Slicing and finishing of the grating may be accomplished in one embodiment, by a microtome-like device which can produce exceedingly thin slices or slivers of material. The surfaces exposed by the cutting along dotted lines 22 and 24 may be made planar and polished so that the grating has uniform optical properties.

The resulting sandwich structure comprising portions 10, 12 and 20 may be sectioned by other means such as sawing or dicing as used in semiconductor chip fabrication, e.g. saws with impregnated diamonds or other abrasive, ultrasonic impact grinding, or a scribe and fracture process. Moreover, polishing and final finishing may entail the steps of optical polishing with superfine abrasives, chemical treatment as used in metallographic sectioning and ion or plasma etching.

Referring again to FIG. 2, grating 30 may be positioned over a top surface 40 of a waveguide 42, positioned on a substrate 44. Incoming light $I_o$ arrives along an axis 46 in which the angle of incidence, $\theta$, is as illustrated. The transmitted beam is illustrated at 48 as $\tau$, the reflected first order beam at 50 as R, and the first order diffracted beam as $D'_{-1}$ at 52. As illustrated, a portion of the light $I_o$ travels down the waveguide as illustrated by optical beam g. In this manner the grating provides an input/output device for the optical waveguide in which as much as 40% of an incoming laser beam is coupled into single propagating modes within a film waveguide.

When the grating is utilized as an optical coupler as illustrated in FIG. 2, it may be cemented or otherwise mounted directly to top surface 40 of the optical waveguide. As illustrated, it need not extend completely across the top surface of the waveguide. Equations governing the angle of incidence and the amount of signal transmitted to the waveguide are known and described in the aforementioned Applied Physics Letters article.

What has therefore been provided in the FIG. 2 embodiment, is the combination of a grating and a thin film optical waveguide in which the grating, rather than being produced by a photolithographic or scribing technique, is produced by the sectioning of a layered structure. The frequency of the grating is exceptionally precise, as is the parallelism of the alternating layers of material.

Figure 3:
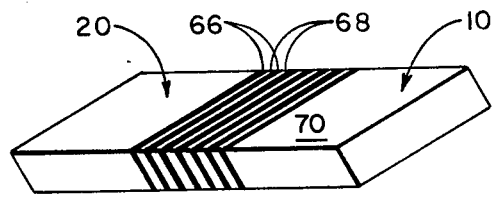
FIG. 3 is a diagramatic illustration of the resulting grating when sectioning is done on a bias so as to provide for alteration in the frequency of the grating.

Referring to FIG. 3, should the frequency of the grating be in need of adjustment, it is possible to section the structure of FIG. 1 at an angle or on a bias such as illustrated by dotted lines 60 and 62 of FIG. 1. The resulting structure is illustrated in FIG. 3, in which the spacing 64 between lines of similar material may be increased with an increasing sectioning angle. Lines 66 and 68 are sandwiched between two rigid structures 10 and 20, with the periodicity at surface 70 being greater for increasing cross-sectioning angles.

It will be appreciated that gratings made by the sectioning of a layered structure may be either reflective gratings or transmission gratings, depending on the materials utilized and manner in which they are to be used. Moreover, the gratings can be mass produced over large surface area substrates and then scribed into large numbers of mini-gratings which may then, for instance, be mounted to the top surfaces of optical waveguides. Thus the gratings may be utilized in communications, in interferometry, or in any type of electro-optical processing.

Figure 4:
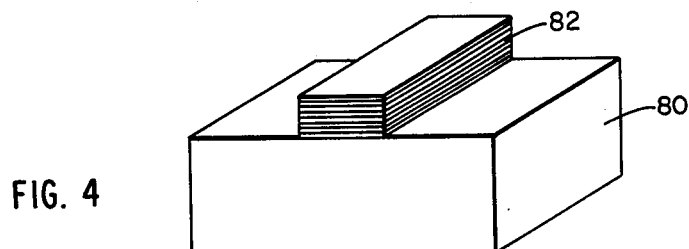
FIGS. 4–7 are perspective views of a process for providing a substrate with the subject optical grating by the stenciling of alternating layers onto the substrate; and, FIG. 8 is a perspective view of a gratng containing substrate fabricated in accordance with the steps of FIGS. 4–6 in which an optical waveguide is directly deposited over the grating and the substrate.
Figure 5:
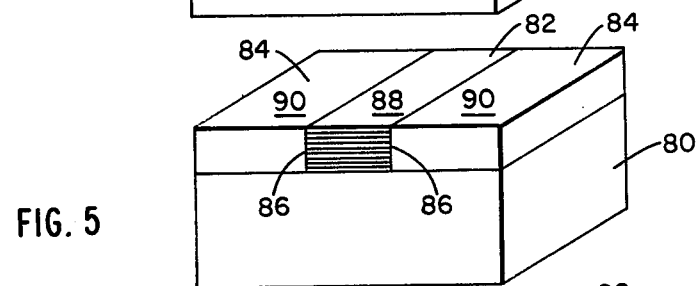

Referring now to FIG. 4, an alternative method of providing a grating is described. In this figure, a substrate 80 is provided with a stenciled grating 82 of alternating layers of material which are deposited through a stencil (not shown) by conventional stenciling techniques. It will be appreciated that what is depicted is a rectilinear body of alternating layers of material which have been sequentially deposited onto substrate 80 by, for instance, vapor deposition through a stenciling mask. As illustrated in FIG. 5, a patterned filler 84 of glass frit or other adhesive material is formed to a height corresponding to that associated with grating 82. Glass frit is utilized when substrate 80 is made of glass or other refractory material, and basically forms an opaque filler in contact with the sides 86 of grating 82. Because the filler material, which also has adhesive qualities if desired, is provided to a height corresponding to the top surface 88 of grating 82, the surfaces 90 of the filler material along with surface 88 can be ground to provide an optically flat surface.

Figure 6:
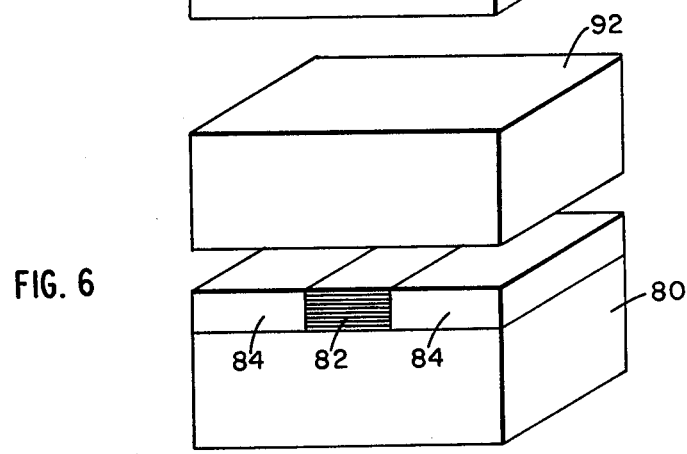
Figure 7:
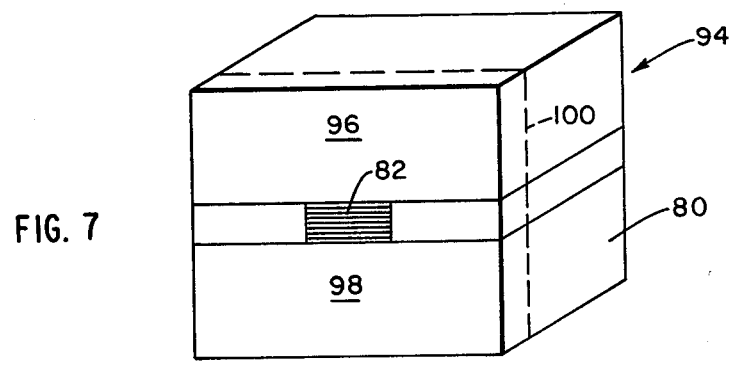
Figure 8:
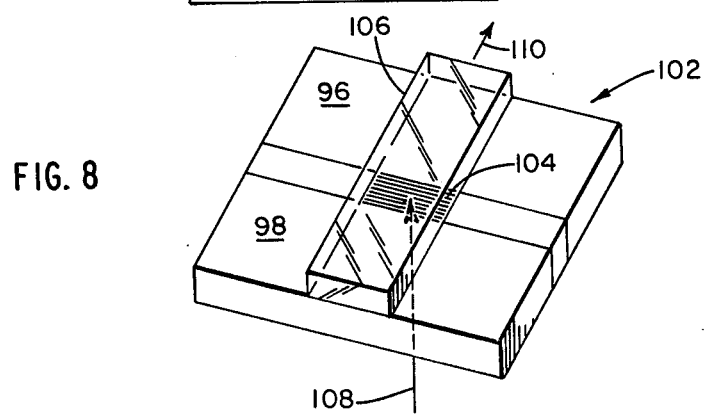

Referring to FIG. 6, a block of material 92 is positioned over the top surface of the structure defined by grating 82 and filler 84, with the block of material in general being of the same type as that of substrate 80. Block 92 is bonded to the top surface of the grating and the filler by conventional means and the resulting structure as shown in FIG. 7, comprises a block of material generally indicated at 94, which has an alternating layer grating sandwiched between substrate blocks 80 and 84. If the faces 96 and 98 respectively of block 84 and substrate 80 are relatively extensive, the sectioning of block 94 along dotted line 100 produces a substrate 102, shown in FIG. 8, of a relatively extensive nature in which a grating 104 extends from the bottom surface of the substrate to the top surface of the substrate. Substrate 102, with grating 104 therethrough, may be utilized as described hereinbefore, as a mini-grating to be adhesively attached to a waveguide or an electo-optical component. However, due to the extensive nature of substrate 80 and block 84, substrate 102 may provide a base for forming any number of optical, electro-optical or electrical components including, for instance, a waveguide 106 which is patterned directly over the top surface of substrate 102, such that a portion of it overlies the exposed portion of grating 104.

Light, generally indicated by arrow 108, may be introduced into waveguide 106 by directing the light so that it impinges on the underside of substrate 102 at the grating. Light entering along a predetermined axis with respect to the grating will be coupled into waveguide 106 so that it will travel through waveguide 106 as illustrated by arrow 110. Likewise, light transmitted through waveguide 106 can be made to exit at the grating in the manner described hereinbefore. It will be appreciated that instead of depositing an optical waveguide on the top surface of substrate 102, any type of electro-optical component may be formed over the grating such that light may be coupled directly to or from the electo-optical device. This permits the fabrication of a substrate having gratings disposed at predetermined locations therethrough, with the specially-prepared substrate then being available as a substrate for either optical waveguides, electro-optical devices or electro-optical devices in combination with standard patterned conductors and other electronic components.

As an alternative, the filler material 84 of FIG. 5 may be eliminated and the block 92 channeled in such a manner that the channel has inside dimensions corresponding to the outside dimensions of grating 82. When the block is positioned over substratee 80 such that grating 82 is contained in the channel, the entire structure may be adhesively attached.

Having above indicated a preferred embodiment of the present invention, it will occur to those skilled in the art that modification and alternatives can be practiced within the spirit of the invention. It is accordingly intended to define the scope of the invention only as indicated in the following claims.

I claim:

1. A method of providing an optical grating with a controllable frequency comprising the steps of:
   sequentially building by thin film deposition techniques a structure having multiple layers of optical material wherein alternating layers are made of different material and,
   forming an optical grating from the structure by sectioning the structure at a predetermined angle, said angle in part determining the frequency of the completed grating.

2. The method of claim 1 and further including the step of polishing the exposed edges of the layers so as to form a planar surface at the exposed edges of the layers.

3. The method of claim 2 and further including the step of providing, prior to sectioning, a top plate so as to sandwich the alternating layers between the top plate and the structure.

4. An optical grating with a controllable frequency having been made by a method comprising the steps of:
   sequentially building by thin film deposition techniques a structure having multiple layers of optical material wherein alternating layers are made of different material; and
   forming an optical grating from the structure by sectioning the structure at a predetermined angle, said angle in part determining the frequency of the completed grating.

* * * * *